United States Patent
Mattson et al.

(10) Patent No.: US 10,458,071 B2
(45) Date of Patent: Oct. 29, 2019

(54) METHOD OF INSTALLING INTERFACE PAD ON CONCRETE TIES

(71) Applicant: voestalpine Nortrak Inc., Cheyenne, WY (US)

(72) Inventors: Steven R Mattson, Cheyenne, WY (US); Scott D. Lesher, Cheyenne, WY (US); Perry E. Nuernberger, Decatur, IL (US)

(73) Assignee: voestalpine Nortrak Inc., Cheyenne, WY (US)

( * ) Notice: Subject to any disclaimer, the term of this patent is extended or adjusted under 35 U.S.C. 154(b) by 316 days.

(21) Appl. No.: 15/638,281

(22) Filed: Jun. 29, 2017

(65) Prior Publication Data

US 2017/0298575 A1    Oct. 19, 2017

Related U.S. Application Data

(62) Division of application No. 14/160,388, filed on Jan. 21, 2014, now abandoned.

(51) Int. Cl.
| | |
|---|---|
| *B28B 23/00* | (2006.01) |
| *E01B 9/68* | (2006.01) |
| *E01B 7/02* | (2006.01) |
| *E01B 26/00* | (2006.01) |
| *E01C 9/04* | (2006.01) |
| *B29K 105/20* | (2006.01) |
| *B29L 31/00* | (2006.01) |

(52) U.S. Cl.
CPC .......... *E01B 9/685* (2013.01); *B28B 23/0056* (2013.01); *E01B 7/02* (2013.01); *E01B 9/683* (2013.01); *E01B 26/00* (2013.01); *E01C 9/04* (2013.01); *B29K 2105/20* (2013.01); *B29L 2031/001* (2013.01)

(58) Field of Classification Search
CPC .......... B29K 2105/20; B29L 2031/001; E01B 26/00; E01B 7/02; E01B 9/683; E01B 9/685; E01C 9/04; B28B 23/00; B28B 23/005; B28B 23/0056
See application file for complete search history.

(56) References Cited

U.S. PATENT DOCUMENTS

| | | |
|---|---|---|
| 2,037,032 A | 4/1936 | Thomas |
| 2,245,296 A | 6/1941 | Piron |
| 2,828,080 A | 5/1954 | Rennels |
| 3,368,806 A | 2/1968 | Szonn |

(Continued)

FOREIGN PATENT DOCUMENTS

| | | |
|---|---|---|
| CA | 2281110 A1 | 2/2000 |
| FR | 2737511 A1 | 2/1997 |

*Primary Examiner* — Mark T Le
(74) *Attorney, Agent, or Firm* — Lowe Graham Jones PLLC

(57) ABSTRACT

An interface pad for a concrete tie includes a resilient contact pad to cushion the tie from any overlying parts in a railway application, such as panels in a grade crossing or rails in a turnout. The pad may be flat or a cupped shape and may be of varying size to accommodate varying tie widths. The invention further comprises means and methods to correctly secure such an interface pad to a concrete railroad tie and minimize the possibility that the interface pad will be forcibly removed from the tie during installation of the tie.

4 Claims, 6 Drawing Sheets

(56) References Cited

U.S. PATENT DOCUMENTS

| | | | |
|---|---|---|---|
| 3,685,782 A * | 8/1972 | Kowell | B28B 23/005 |
| | | | 249/86 |
| 3,831,923 A | 8/1974 | Meldrum | |
| 4,117,977 A | 10/1978 | Whitlock | |
| 4,421,272 A | 12/1983 | Whitlock | |
| 4,445,640 A | 5/1984 | Calliet | |
| 4,449,666 A | 5/1984 | Hales et al. | |
| 4,454,985 A * | 6/1984 | Carter | E01B 9/306 |
| | | | 238/217 |
| 4,846,401 A | 7/1989 | Kennel | |
| 5,494,212 A | 2/1996 | Owen | |
| 5,538,182 A | 7/1996 | Davis et al. | |
| 5,549,327 A | 8/1996 | Rusche | |
| 5,626,289 A | 5/1997 | Demers et al. | |
| 5,716,539 A * | 2/1998 | Brickner | B28B 23/005 |
| | | | 249/134 |
| 5,743,509 A | 4/1998 | Kanda | |
| 6,422,478 B1 | 7/2002 | Lucas, Jr. | |
| 2005/0257579 A1 | 11/2005 | Conrad | |
| 2006/0076461 A1 | 4/2006 | DeRose et al. | |
| 2007/0200005 A1 | 8/2007 | Corbett, Jr. et al. | |
| 2008/0083835 A1 | 4/2008 | Girardi et al. | |
| 2008/0265050 A1 | 10/2008 | Osler | |
| 2009/0045265 A1 * | 2/2009 | Cox | E01B 3/28 |
| | | | 238/343 |
| 2011/0079943 A1 | 4/2011 | Wolf | |

* cited by examiner

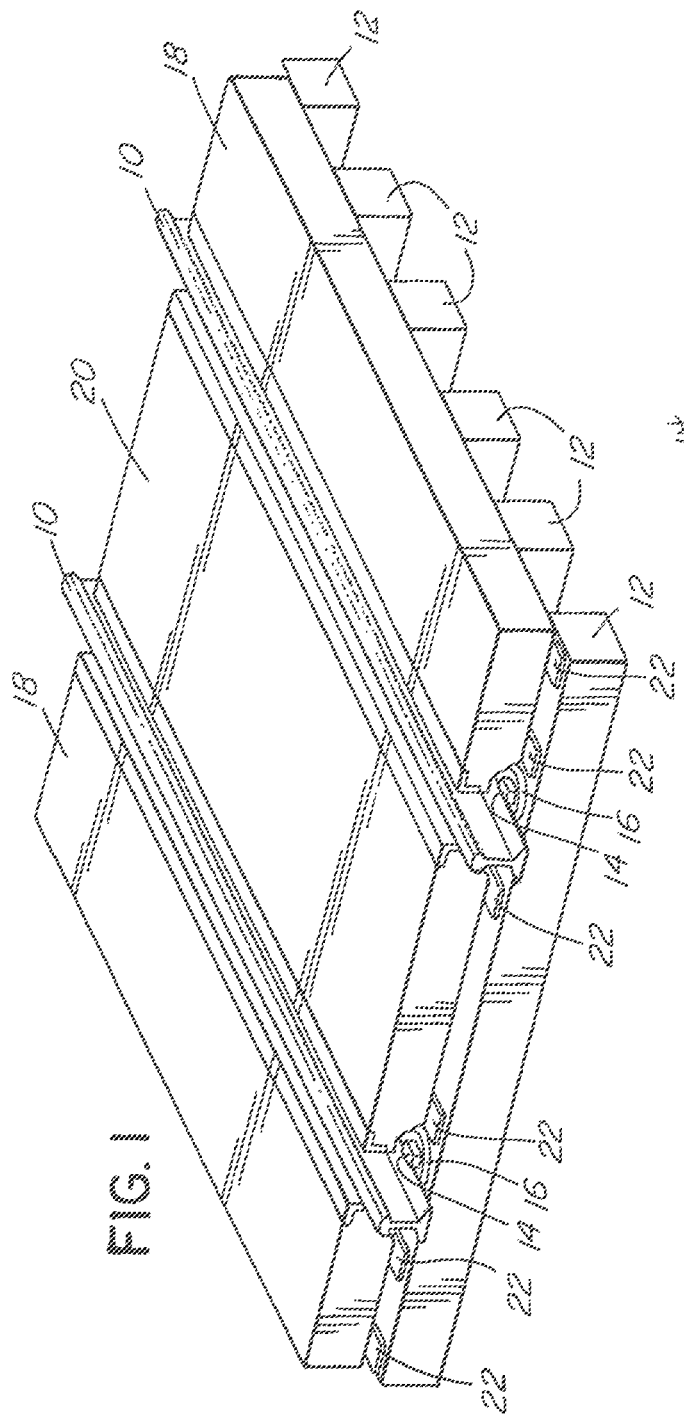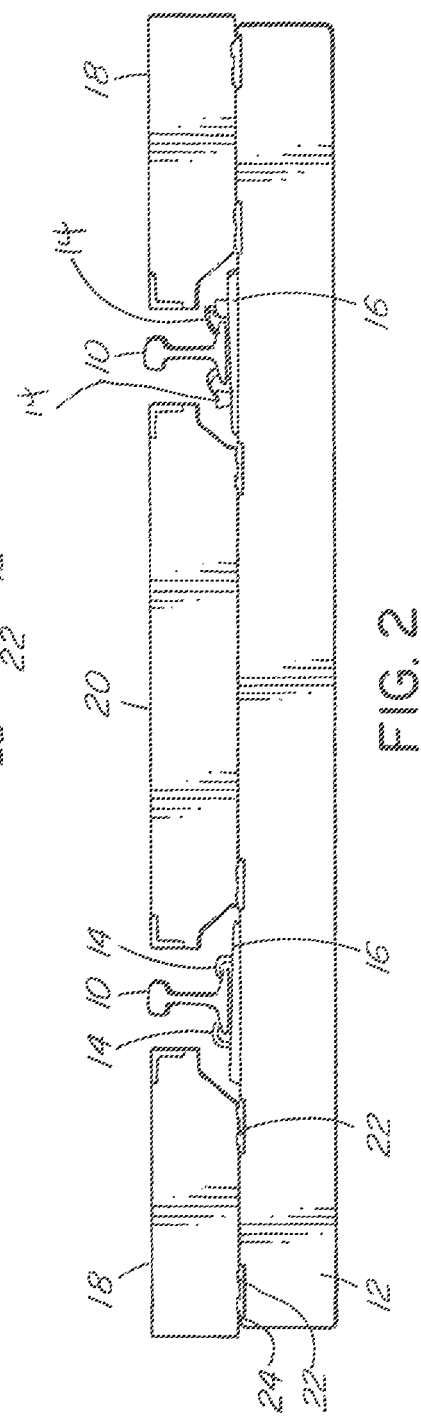

METHOD OF INSTALLING INTERFACE PAD ON CONCRETE TIES

CROSS REFERENCE TO RELATED APPLICATIONS

This application is a divisional of U.S. patent application Ser. No. 14/160,388, filed Jan. 21, 2014.

FIELD OF THE INVENTION

This invention relates to an apparatus used in concrete railway ties, specifically an interface pad to provide a cushion between the ties against impact and abrasion with any overlying parts. The invention also relates to simplifying installation of such interface pads in a concrete tie.

BACKGROUND OF THE INVENTION

In a grade crossing (also called a level crossing), gaps in the roadway around the railway tracks are filled in with large concrete, steel or polymeric panels, which rest on wood or concrete ties and are approximately flush with the railheads. As vehicles pass over the crossing, the panels experience significant loading and will deflect downwardly. If a panel is not resting directly on a tie, which happens in situations where tie dimensions are not uniform, for example, that deflection may push the panel sharply against the top surface of the tie, possibly damaging the panel, the tie or both. Repeated uncushioned impacts can eventually cause failure of the panel or tie.

It is therefore preferable to have a protective cushioning means between the panels and the ties, to act as both a shock absorber and to help absorb normal support surface variations. An interface pad is designed to cushion and support the panels and to compensate for any irregularities in the top surface of the tie that might otherwise provide a point of impact when the panels deflect against the ties as vehicles pass over.

It may also be necessary to provide such cushioning between concrete ties and other parts overlying the ties in other railway applications. For example, in a concrete turnout or switch, the rails rest on steel plates that are then connected to the tie. It may be beneficial to provide cushioning between the plates and the ties against any impacts or abrasion. Such interface pads may also be used to cushion trackwork, rails, and/or plates in other railway applications.

U.S. Pat. No. 5,626,289 to Demers Jr. et al. discloses a grade crossing, and briefly refers to "known" interface pads for use between the tie and the panels, without providing any real details of the pads. Similarly, U.S. Pat. No. 4,449,666 to Hales et al. discloses a layer of elastomeric compound to separate the panels of a grade crossing from the ties, to provide flexibility to the panels and allow for adjustment of the height of the panels relative to the rail heads. However, not much more detail about the pad itself is provided.

It is known to simply place an elongated (i.e. covering substantially all of the exposed areas of the tie) interface pad over a tie once the tie is in place under a track. The drawback to this is that it creates an additional step in the installation process, as each pad, known as a conformal pad, must be hand-placed on each tie during installation. Further, because there is no physical connection between the pad and the tie, it is difficult to ensure that the pads stay in place as the ties are installed under the rails, or as panels or other overlying parts are installed on the ties, because these situations generally require at least the ties be moved sideways, such that the parts or panels slide over the top surface of the ties. These sliding motions will tend to scrape any loose pads off the top of the tie.

These drawbacks have been addressed by creating shaped interface pads that interact with multiple surfaces of the tie, providing an improved fit between the tie and the pad. For example, U.S. Pat. No. 6,422,478 to Lucas Jr. and Canadian Patent No. 2281110 to Bruyn both show tie pads that are carefully shaped and engineered not only to provide cushioning pockets within the body of the interface pads, but also to fit over the top chamfers of a concrete tie, keeping the pad in place through friction and cooperation with the tie. Similarly, US Pat. App. No. 2007/0200005 to Corbett Jr. et al. describes several means to attach the pads to the tie, such as wrapping around the chamfered edges of the tie, direct attachment to the panels, and physical abutment with rail attachment hardware, ballast or roadway, but does not discuss mechanically fastening the pads to the ties. The main drawback to these shaped interface pads is that they do not address the issues of increased installation time for placing one or more pads on each tie during installation or of potential loss of the unsecured pads during or after installation.

In order to directly deal with this issue, it is known to glue an elongated interface pad, or one or more smaller interface pads, on top of the tie before shipping the tie to the installation site. However, glued-on interface pads are still highly susceptible to displacement during shipping or at any one of several points in the process involved in constructing grade crossings or turnouts, which wastes money and materials.

More secure methods of connecting interface pads to ties have not gained widespread use, possibly because of the difficulties or costs associated with placing mechanical fasteners, such as bolts, into the top of a concrete tie. Further, simply bolting a flat rubber pad into the top of a tie still may not ensure that the pad stays in place during installation, as the rubber pad can be torn off over the fastener if it is pulled with sufficient force. In addition, placement and number of fasteners may be of concern—a fastener near or around the perimeter of the pad may be more secure and stable than a central fastener, but may then require more fastening points and therefore more time to install enough fasteners to properly secure the pad to the tie.

It is therefore an object of the invention to provide an interface pad, specifically for use in a concrete tie, that overcomes one or more of the foregoing difficulties.

In particular, it is an object of the invention to provide a pre-attached interface pad for a concrete tie that eliminates the need to ship loose conformal pads to the site as well as on-site handling and installation of those conformal pads.

It is a further object of the invention to provide an interface pad that is mechanically attached to a concrete tie, in order to eliminate undesirable movement of the pad during shipping, installation and service.

It is a further object of the invention to provide an interface pad that is manufactured and shaped for secure installation on a concrete tie.

These and other objects of the invention will be appreciated by reference to the summary of the invention and to the detailed description of the preferred embodiment that follow. Note that the objects referred to above are statements of what motivated the invention rather than promises. Not all of the objects are necessarily met by all embodiments of the invention described below or by the invention defined by each of the claims.

SUMMARY OF THE INVENTION

In one embodiment, the interface pad of the invention is a two-piece system comprising a stiffener supporting a resilient cushioning pad made of a durable, elastic material. Preferably the stiffener is manufactured first, and then the resilient pad is molded onto the stiffener. The resilient pad may be divided into discrete quarters or other fractions, which helps to eliminate undesirable pad deformation during manufacture. The outer edges and corners of the resilient pad are preferably given a chamfered, beveled or rounded shape, or any shape suitable to minimize sharp or protruding parts, in order to minimize the chance that a corner or edge of the interface pad will catch on something during transport or installation and be torn or scraped off the tie.

In an alternative embodiment, the stiffener may be encompassed substantially within the resilient pad. Preferably the stiffener is manufactured first, and then the resilient material is molded around the stiffener. In this embodiment, the stiffener may be a plate, in which case the features and functions of this embodiment of the invention are similar to those described in relation to the first embodiment. Alternatively, the stiffener may be shaped, such as in a cupped piece substantially within the resilient pad, to provide different footprints for the interface pad, which may be useful in different grade crossing situations.

In another alternative embodiment, the resilient pad may be a one-piece cupped pad, which may not include a separate stiffener element.

In some embodiments, the interface pad is designed to be easily mechanically attached to a tie, such as with a fastener through a hole in the pad. The fastener hole is preferably located to accommodate a fastener that can be recessed substantially or completely within the interface pad to prevent the installed fastener from interfering with the panel. The tie itself preferably has a slight recess to accommodate the interface pad, reducing the overall profile of the interface pad once it is in place on a tie, thereby minimizing the potential for displacement of the pad during handling and installation, particularly by rails, plates or grade crossing panels sliding over the top surface of the tie. Alternatively, the interface pad may be cast directly into a concrete tie, eliminating the need for a separate fastener. This would also eliminate the time it would otherwise require to attach the fastener during manufacture or installation and minimize the chances that the pad will be pulled off of the tie during shipping, installation or maintenance.

In one aspect, the invention comprises an interface pad for a concrete tie, the interface pad having an underside to be located proximate the tie and an upper side opposed to the underside, and further comprising a stiffener; a resilient pad supported by the stiffener; and at least one fastener passageway through the stiffener and the resilient pad to accommodate a fastener to secure the interface pad to the tie, wherein the passageway may be shaped to allow the fastener to recede substantially below the upper surface of the resilient pad. The stiffener may comprise a substantially flat plate, although the passageway may extend below the underside of the plate. The stiffener may comprise a plurality of pieces, each of the pieces comprising a substantially flat plate. Alternatively, the stiffener may be cupped and located proximate the fastener passageway in a smaller pad. The overall interface pad may be substantially flat, or may be convex in shape. At least one outside edge of the resilient pad may be chamfered, beveled or rounded, and if the interface pad is a shape, such as a quadrilateral, comprising edges separated by corners, the corners may be chamfered, beveled or rounded.

In a further aspect, the resilient pad on the interface pad may comprise a plurality of sections divided by at least one channel.

In a further aspect, the stiffener may comprise at least one aperture into which the resilient pad protrudes. The aperture may taper towards the upper side of the resilient pad, relative to the underside of the resilient pad.

In another aspect of the invention, the resilient pad of the interface pad may substantially surround the stiffener. In an embodiment wherein the stiffener comprises a substantially flat plate, the resilient pad may comprise layers of resilient material on opposed sides of the plate. The underside of the passageway extending below the substantially flat plate may not be completely within the resilient material. In an embodiment wherein the stiffener is cupped proximate said fastener passageway, the underside of the stiffener may not be completely within the resilient pad.

In another aspect, the invention comprises an interface pad for a concrete tie, comprising a tubular body having opposed first and second ends separated by a sidewall; and a contact pad on the second end; wherein the perimeter of the contact pad is smaller than the perimeter of the second end. The sidewall may flare outwardly from the second end to the first end. A lip may extend from the first end.

In a further aspect, the contact pad may comprise a central pad at least partially surrounded by an outer pad. Each may extend out a distance from the second end, and the distance extended by the central pad may be less than the distance extended by the outer pad. One or more locking tabs may extend from the contact pad or from another portion of the second end.

In yet further aspects, the interface pad may comprise a cylindrical body. The body may be solid or partially solid.

In another aspect, the invention comprises a concrete tie comprising at least one interface pad as described herein. The tie may further comprise a recess in the tie to accommodate each interface pad.

In yet another aspect, the invention comprises a method of installing an interface pad in a concrete tie, comprising the steps of providing at least one interface pad comprising a tubular body having opposed first and second ends separated by a sidewall and a contact pad on the second end; placing a template over the interface pad, the template comprising at least one opening adapted to surround the pad and abut the second end; placing the template and the interface pad in a concrete tie form; casting the concrete tie over the template and the interface pad; and removing the template from the tie once the concrete has hardened.

In a further aspect, the interface pad may comprise one or more locking tabs extending from the pad and the template further comprises one or more notches to accommodate the locking tabs. The step of removing the template may comprise pulling the template over the locking tabs. The step of placing a template over the interface pad may comprise inserting the interface pad into the opening and twisting the interface pad to connect the locking tabs with the notches.

The foregoing was intended as a broad summary only and of only some of the aspects of the invention. It was not intended to define the limits or requirements of the invention. Other aspects of the invention will be appreciated by reference to the detailed description of the preferred embodiment and to the claims. Moreover, this summary should be read as though the claims were incorporated herein for completeness.

BRIEF DESCRIPTION OF THE DRAWINGS

The preferred embodiment of the invention will be described by reference to the drawings in which:

FIG. 1 is a perspective view of the interface pad of the invention in place on a tie in a typical grade crossing;

FIG. 2 is an elevation view of interface pad and grade crossing of FIG. 1;

DETAILED DESCRIPTION OF THE INVENTION

Figure 3:
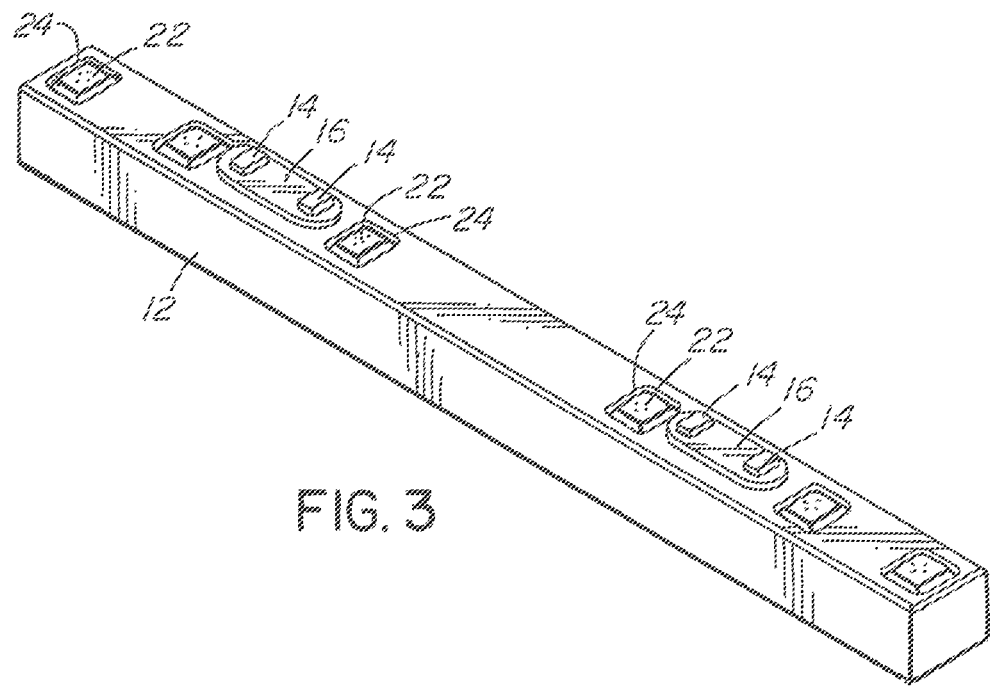
FIG. 3 is a perspective view of a tie bearing interface pads of the invention.

Referring to FIGS. 1-3, a grade crossing typically includes rails 10 supported on ties 12. Each rail 10 is fastened to the ties 12 in a standard way, such as with any suitable fastener 14, and may be seated on a supporting area, such as tie plate 16. In order to allow vehicular traffic to cross the tracks without damage, one or more panels 18 are placed on each of the field sides of the rails between the roadway and the rails, and one or more gauge side panels 20 are placed between the rails. Preferably the edges of the panels 18, 20 are shaped to fit closely around the rails 10, preventing excessive moisture and debris from penetrating the crossing. Suitable gauge and field seals (not shown) may be placed between the rails 10 and panels 18, 20 to further prevent unwanted debris from penetrating the crossing. The panels 18, 20 are also preferably similar in height to the rails 10, minimizing the shock felt by a vehicle passing over the crossing. One or more interface pads 22 are placed at suitable intervals along the tie 12, providing cushion and support for panels 18, 20. Each interface pad 22 is preferably located in a recess 24 in tie 12. It will be understood that the number of interface pads 22, and the location of those pads are shown in FIGS. 1-3 for illustration only and that the invention is not limited to a specific number of interface pads, nor to any specific location of those pads on a tie. Such placement and number of interface pads may vary depending on the specific application, such as grade crossing, turnout, switch or other, where the concrete tie is to be installed.

Figure 4:
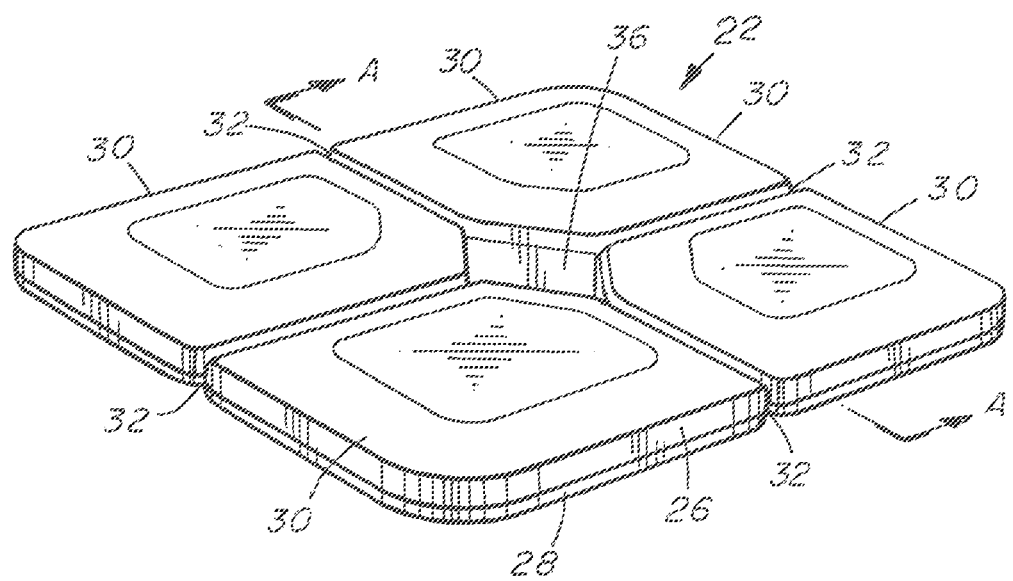
FIG. 4 is a perspective view of an interface pad of the invention.
Figure 5:
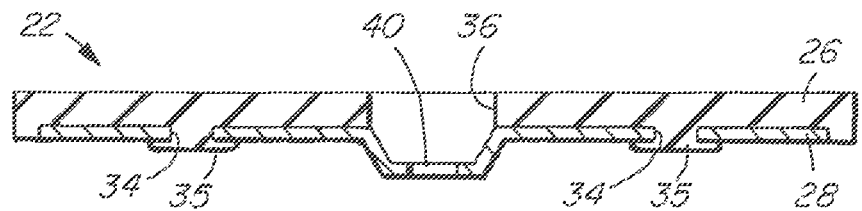
FIG. 5 is a sectional view of the interface pad of FIG. 4, taken along line A-A.

Referring now to FIGS. 4 and 5, interface pad 22 is shown as approximately rectangular, although any suitable shape may be chosen. The interface pad 22 as shown includes a resilient cushioning pad 26 supported by a stiffener 28. The stiffener 28 is preferably made of a suitable material such as steel, glass reinforced nylon, or similar material, such that the composite assembly is stiff enough to resist being pulled off the tie. The stiffener 28 is illustrated and described in these figures as a unitary plate, although it will be understood that an interface pad 22 may alternatively comprise two or more segments making up stiffener plate 28, the segments retained as stiffener 28 by connection with resilient pad 26 as described below.

Preferably resilient pad 26 is made of a material such as rubber, artificial rubber, polyurethane, or any similarly durable and resilient material of approximately a 60 Shore A to 56 Shore D durometer hardness, such that the resilient pad 26 is durable enough to withstand scraping and pulling that might occur as the tie is being installed and as any overlying parts are being installed on the ties, while still being able to cushion and support the overlying parts. It is also contemplated that resilient pad 26 may be made of a combination of one or more materials having different properties, such that the same pad may comprise different hardness or resilience properties throughout its body. This may be useful in selecting the proper pad for a given application with particular expected weight and cushioning requirements, or for adjusting pad requirements based on circumstances such as being located in different locations on a tie, or on different locations within a switch, for example.

To manufacture the interface pad 22, the stiffener 28 may be produced first, in dimensions corresponding to the width of the rail tie 12 on which it will be disposed. The dimensions may further be selected based on the approximate shape and approximate depth of a recess 24 (shown in FIG. 2) in the tie 12. The resilient pad 26 may then be molded onto the stiffener 28. The resilient pad 26 may comprise one relatively smooth, even layer, or it may comprise two or more sections 30, which may be separated such as by channels 32. Molding resilient pad 26 in multiple sections 30 may provide advantages during the molding process, such as preventing undesirable curling or buckling of the interface pad 22.

To ensure durable contact between the resilient pad 26 and the stiffener 28, an adhesive or other suitable bonding agent may be applied between the resilient pad 26 and stiffener 28. Additionally or alternatively, the stiffener 28 may comprise apertures 34, best seen in FIG. 5, into which the warm resilient material will flow while it is being molded, mechanically interlocking the resilient pad 26 and stiffener 28, such as with plugs 35. It will be understood, although FIG. 5 shows plugs 35 extending completely through apertures 34 and under a portion of stiffener 28, plugs 35 may or may not extend completely through aperture 34, and/or may or may not flow underneath the bottom of stiffener 28. Further, aperture 34 may be tapered or stepped, such that the end 42 of the aperture 34 on the resilient pad 26 side of the stiffener 28 is narrower than the end 44 of the aperture 34 away from the resilient pad 26. This provides a wedge-shaped plug 35 that is difficult to remove from the aperture 34.

Interface pad 22 may be provided with a passageway 36 to accommodate a fastener at or near the centre of the interface pad, or at any point or points suitable to sufficiently fasten the interface pad 22 on a tie. Preferably the upper portion of the passageway 36 at the top of the resilient pad 26 has a somewhat larger diameter than the lower portion 40 of the passageway 36 where it passes through the stiffener 28. This change in diameter may be accomplished by any suitable method, such as the shoulder shown in FIG. 5, or a taper through the length of passageway 36. Providing a wider passageway 36 allows room to insert a fastener (not shown), such as a bolt or any other suitable fastening means, through the interface pad 22 and into a tie, such that the fastener head is accommodated substantially within the thickness of the resilient pad 26 and does not protrude substantially above the top surface of the interface pad 22. Alternatively or additionally, passageway 36 may extend below the level of the rest of the stiffener 28, again providing a space to accommodate a fastener substantially completely below the upper surface of the interface pad 22. Combined with the recess 24 (shown only in FIGS. 1-3), this arrangement secures the interface pad 22 to the tie while preventing the fastener from interfering with the overlying parts, such as plates or grade crossing panels. Further, fastening the interface pad 22 onto the tie with a removable fastener allows for easy replacement of a single pad 22 if necessary, without disrupting the surrounding supporting pads 22. It will be understood that, instead of or in addition to providing the central fastener passageway 36, a fastener passageway may be provided in one or more of the sections 30. This may increase the overall strength of the connection between the interface pad 22 and the tie.

The recess 24 also allows a slightly thicker interface pad 22 to be installed, for example a ½" pad instead of a more typical ¼", providing better cushioning without significantly increasing the overall height of a tie bearing the installed interface pads 22. This arrangement minimizes the chances that an interface pad 22 will be scraped off of a tie during shipping or installation of the concrete tie in place.

In an interface pad 22 shaped like a rectangle, as show in the figures, the corners separating the outer edges of the resilient pad 26 are preferably shaped to minimize or eliminate sharp or protruding edges, such as by providing chamfered, beveled or rounded corners, in order to minimize the chances that a corner of the interface pad 22 will catch on something during shipping or installation and be torn off the tie. It will be understood that an interface pad of a shape having corners, such as a triangle, or a square, rectangle or other quadrilateral shape, may preferably have similarly shaped corners. Further, it is preferred that all outer edges of the resilient pad 26 be similarly shaped, also in order to minimize the chances that the resilient pad 26 will catch on something.

Figure 6:
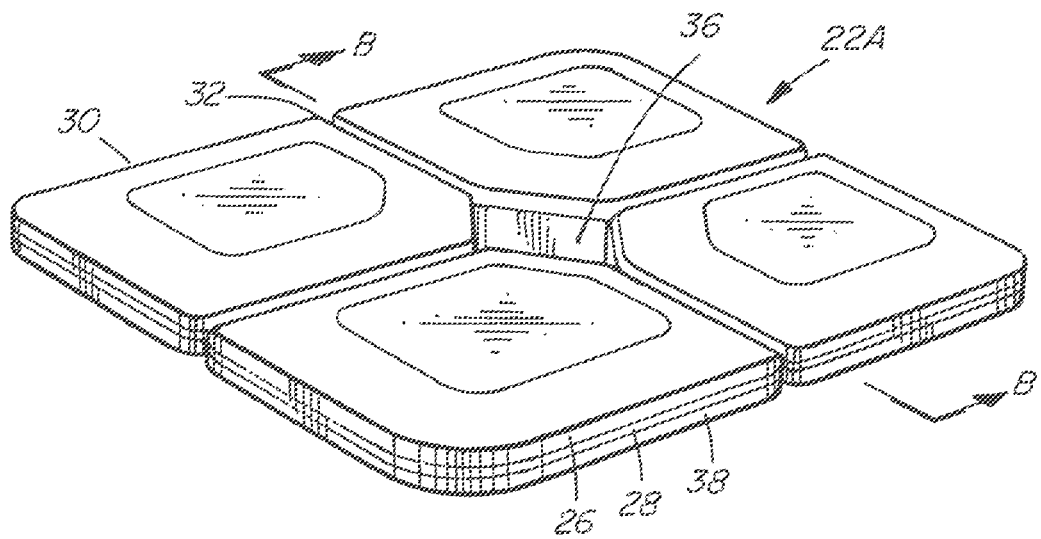
FIG. 6 is a perspective view of a second embodiment of the interface pad of the invention.
Figure 7:
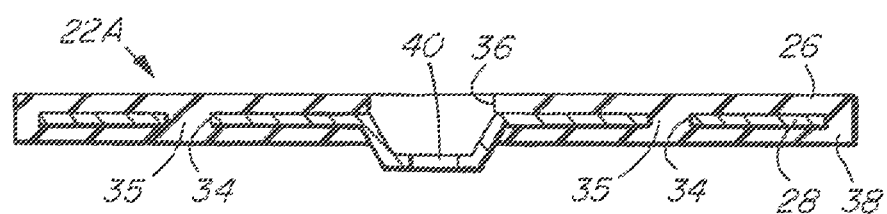
FIG. 7 is a sectional view of the interface pad of FIG. 6, taken along line B-B.

A second embodiment of the interface pad 22A is shown in FIGS. 6 and 7. This embodiment is structurally similar to that shown in FIGS. 4 and 5, except that stiffener 28 is positioned between resilient pad 26 and a second resilient pad 38. Otherwise, the foregoing description of the interface pad 22 assembly and properties is applicable to the second embodiment 22A, and similar parts are shown with the same reference numbers as those in FIGS. 4 and 5.

In any of the foregoing embodiments, the interface pad 22 may be provided with some small degree of curvature, such that the pad 22 itself is slightly convex on the upper side, as best shown in FIG. 6. When the pad 22 is installed on a tie using a fastener inserted into passageway 36, the central portion of interface pad 22 is forced to flatten out, ensuring good contact with the tie 12 in recess 24. Alternatively or in addition, the upper surface of recess 24 may be formed with some degree of curvature, such that it is convex and more likely to closely fit with the underside of the interface pad 22.

Figure 8:
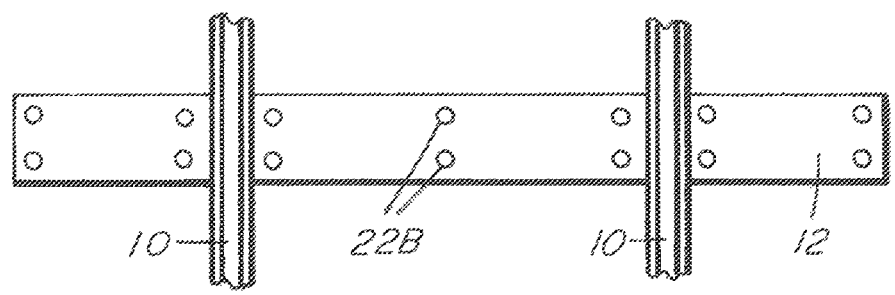
FIG. 8 is a plan view of a tie bearing an alternative embodiment of the interface pads of the invention.

In some situations, it may be preferable to use an interface pad 22 having a smaller footprint. For example, a narrower tie would require a smaller interface pad. An interface pad with a smaller footprint relative to the size of the fastener has less pad material located some distance away from the fastener. This can increase the inherent stability of the pad, making it more difficult to remove from the tie. FIG. 8 shows a tie 12 including several smaller interface pads 22B. Again, it will be understood that the number of interface pads 22B, and the location of those pads are shown in FIG. 8 for illustration only and that the invention is not limited to a specific number of interface pads 22B, nor to any specific locations or configuration of those pads on a tie.

Figure 9:
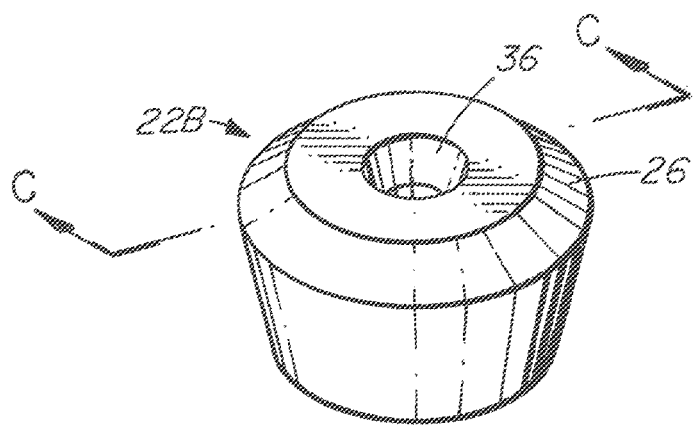
FIG. 9 is a perspective view of an alternative embodiment of the interface pad of the invention.
Figure 10:
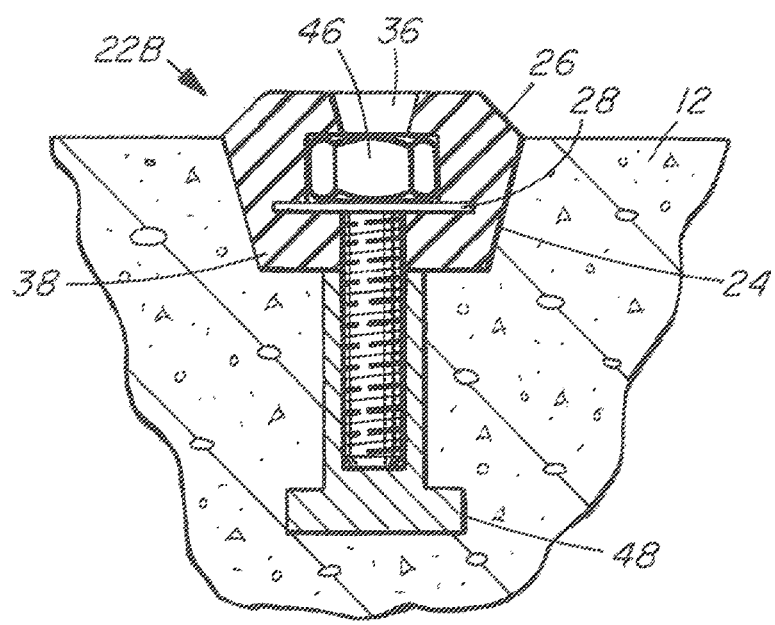
FIG. 10 is a sectional view of the interface pad of FIG. 9, taken along line C-C, installed on a tie.

FIGS. 9 and 10 show perspective and cross-sectional views of an embodiment of interface pads 22B having a smaller footprint. In this embodiment, the resilient pad is molded above and below 26, 38 stiffener 28, which is a small plate 28. Fastener passageway 36 accommodates fastener 46, which is shown as a bolt, but which may be any suitable fastener. Recess 24 is preferably relatively deep compared to the amount of resilient pad 26 extending above the top surface of tie 12, in order to accommodate and stabilize the interface pad 22. Additional support may be provided by concrete anchor 48, which further assists in retaining fastener 46 against any lateral external forces that might try to remove the interface pad 22 from the tie 12.

Figure 11:
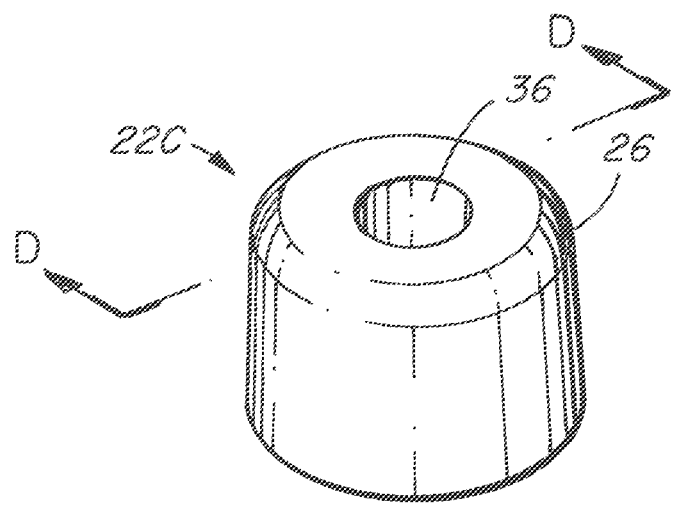
FIG. 11 is a perspective view of another alternative embodiment of the interface pad of the invention.
Figure 12:
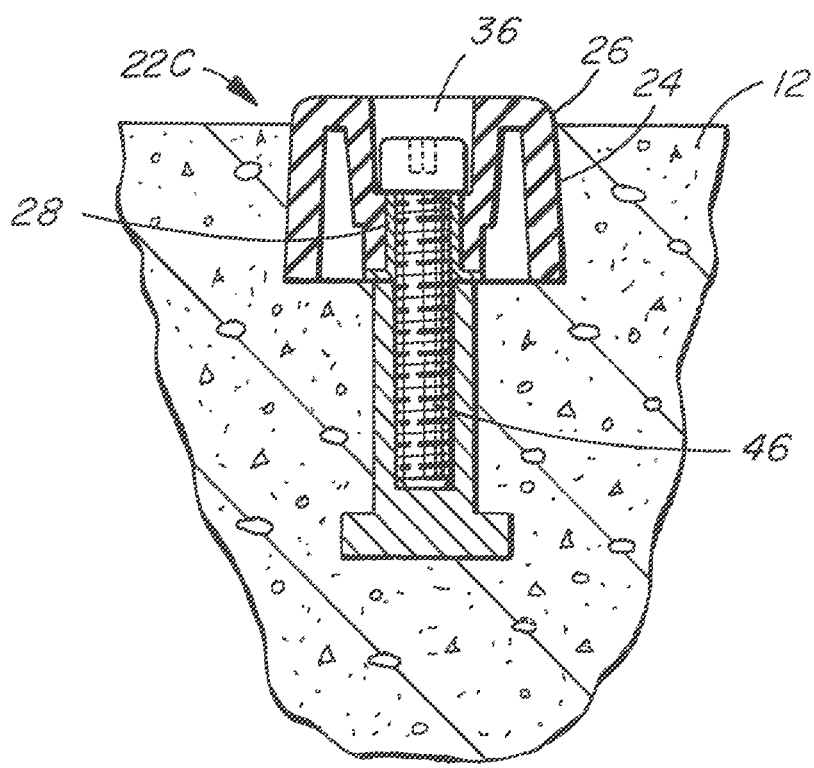
FIG. 12 is a sectional view of the interface pad of FIG. 10, taken along line D-D, installed on a tie.

FIGS. 11 and 12 show perspective and cross-sectional views of another embodiment of interface pads 22C having a smaller footprint. In this embodiment, the stiffener 28 has a cupped shape, positioned around the fastener passageway 36, providing support and stability directly to the fastener 46 as well as to the interface pad 22C as a whole. Otherwise, the foregoing descriptions of the interface pad 22 assemblies and properties are applicable to the fourth embodiment 22C, and similar parts are shown with the same reference numbers as those in the other figures. It will be understood that while the embodiment of the interface pad 22C is shown as an approximately circular pad, similar shapes, such as squares, rectangles, ovals or other shapes, particularly pads having rounded, chamfered or beveled edges and/or corners, may also be used.

Figure 13:
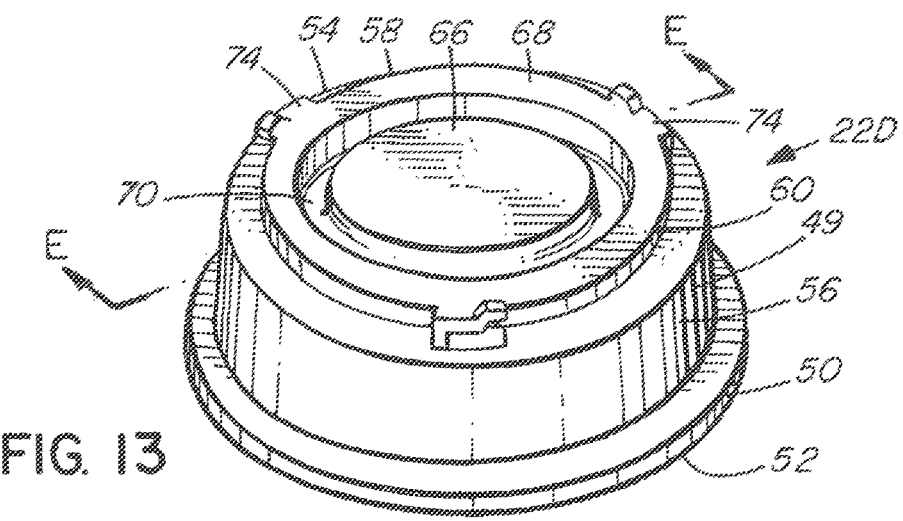
FIG. 13 is a perspective view of another alternative embodiment of the interface pad of the invention.
Figure 14:
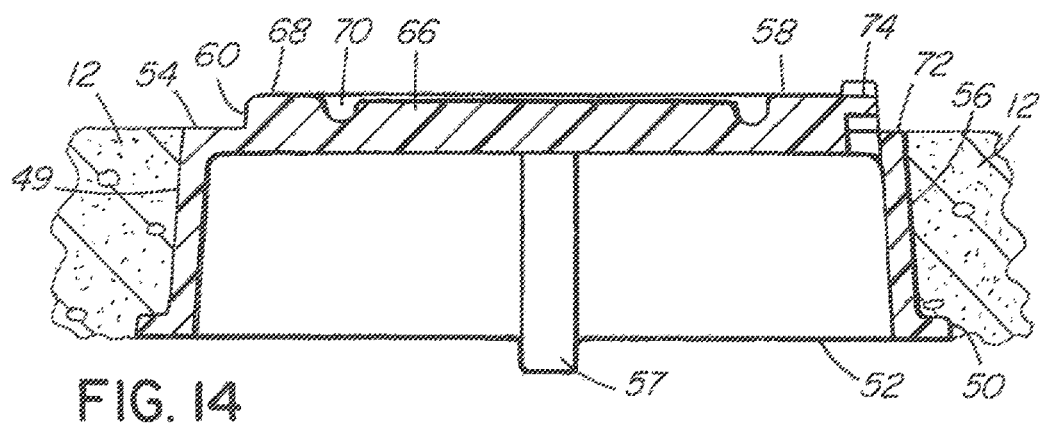
FIG. 14 is a sectional view of the interface pad of FIG. 13, taken along line E-E, installed on a tie.

FIGS. 13 and 14 show perspective and cross-sectional views of another embodiment of interface pads 22D which may be used without a stiffener or a fastener. In this embodiment, the fastener may be cast directly in to the upper surface of the tie 12, by a preferred installation method which will be discussed later.

Interface pad 22D comprises an approximately tubular body 49, having a first end 52 and an opposed second end 54 separated by a sidewall 56. Sidewall 56 of the body 49 extends from the first end 52 to the second end 54, at either approximately a 90 degree angle, or at an obtuse angle, such that the sidewall 56 flares between the second end 54 and the first end 52. First end 52 may be open as shown, or may be completely or partially closed, as long as the selected material is the proper stiffness to allow for the correct amount of deflection under loading. It will also be understood that while the illustrated embodiment of the interface pad 22D shows tubular body 49 as an approximately cylindrical shape, similar shapes, such as squares, rectangles, ovals or other shapes, may also be used. Likewise, the tubular body may be hollow, as shown, or may be partially or completely solid, as long as the selected material has the properties to perform as desired under loading.

Lip 50 may be provided at first end 52, extending outwardly of sidewall 56 as shown, or inwardly to close or partially close first end 52. Lip 50 may also be omitted, although it may be preferable in that case to provide a sufficiently large flare in sidewall 56 to ensure that the interface pad 22D cannot be removed from the concrete tie by pulling on second end 54. Alternatively or in addition, one or more ribs 57 or other protrusions maybe provided within body 49 to assist in preventing body 49 from rotating within the concrete tie.

Second end 54 may be provided with a contact pad 58, defined by sidewall 60 having an outer perimeter that is preferably somewhat smaller than the perimeter of the sidewall 56, but the perimeter of contact pad 58 could in fact be nearly the same as the perimeter of sidewall 56. Contact pad 58 may be a unitary piece, or may include a central pad 66 at least partially surrounded by outer pad 68. Central pad 66 may be separated from outer pad 68 by a recess 70. Central pad 66 may be the same height as outer pad 68, but is preferably slightly shorter. This allows outer pad 68 to act as a first compression zone, deflecting first under the weight of the overlying panels 18, 20 (not shown), which helps to absorb any non-uniformity in the panels, along the length of the tie, or in the tie bed depth, and therefore provides more even support, minimizing additional stresses and rocking in the panels. Under the additional weight of passing traffic, the central pad 66 engages with the panels as a second compression zone, taking its share of the weight and spreading the load out over a larger surface area.

Alternatively, or in addition, central pad 66 may be provided in a different material than outer pad 68, in order to ensure that the cushioning performance is suitable for the chosen railway application. For example, the cushioning requirements for an overlying concrete pad in a grade crossing may be different than for an overlying rail plate in a switch and it is preferable to be able to modify the cushioning properties of the interface pad 22D for the specific application. It is also contemplated that this performance adjustment may be provided in an interface pad 22D in which central pad 66 and outer pad 68 are made of the same material, processed or otherwise formulated differently, to provide the desired cushioning performance.

Outer pad 68 is shown as a single pad, completely surrounding central pad 66, but it will be understood that outer pad 68 may comprise one or more pieces that are capable of providing a similar effect, and that central pad 66 is not necessarily completely surrounded.

As best shown in FIG. 14, interface pad 22D is preferably embedded directly into a concrete tie 12. This may be in any configuration suitable for the specific application, such as the configuration shown in FIG. 8, which might be used in a grade crossing application, for example. Second end 54 is generally even with the top surface of the tie 12, and contact pad 58 extends above the tie 12 to separate it from overlying panels 18, 20 (not shown). Contact pad 58 is also preferably slightly separated from the tie 12, such as by recess 72, to allow contact pad 58 to expand laterally under the weight of the panels without being restricted by contact with the tie 12. Recess 70 similarly allows central pad 66 to expand under pressure, without being restricted by contact with outer pad 68.

Interface pad 22D may further comprise one or more locking tabs 74 extending from contact pad 58, and/or outer pad 68.

Except as described above, the descriptions of the interface pad 22 assemblies and properties are applicable to the fifth embodiment 22D, and similar parts are shown with the same reference numbers as those in the other figures. It will be understood that while the embodiment of the interface pad 22D is shown with an approximately circular contact pad 58, similar shapes, irregular or regular, such as squares, rectangles, ovals or other shapes, may also be used. For embodiments wherein contact pad 58 comprises a central pad 66 and an outer pad 68, it will be further understood that central pad 66 and outer pad 68 need not be circular as shown, and that either or both may also be any other regular or irregular shape, as suitable. The central pad 66 and outer pad 68 need not be the same shape as each other, and, as noted above, outer pad 68 need not completely surround central pad 66.

Figure 15:
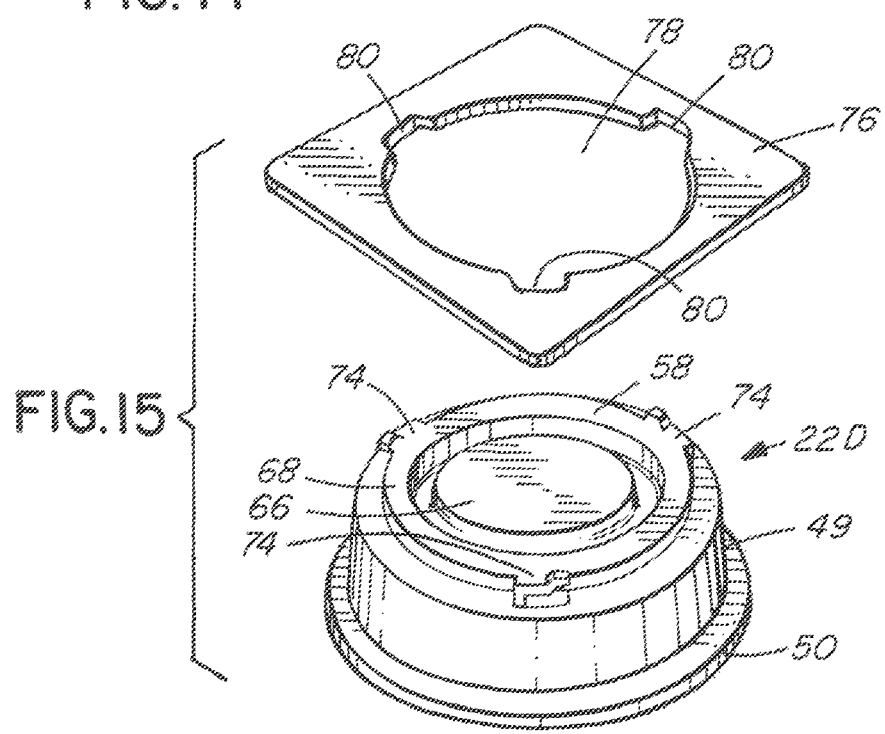
FIG. 15 is a perspective view of an installation template for use with the interface pad of FIG. 13.

Referring now to FIG. 15, template 76 may be used to install interface pads 22D onto tie 12 (not shown). Template 76 comprises one or more central openings 78 having dimensions matching the outer dimensions of contact pad 58, and one or more notches 80 in each central opening 78. Notches 80 are spaced and dimensioned to match locking tabs 74, although it is possible to provide a central opening 78 having more notches 80 than tabs 74, which may provide increased flexibility in interface pad 22D configurations. Template 76 is provided for a given tie, such that an appropriate number of central openings 78 are provided and located at appropriate locations on the tie. It will be understood that the number of openings 78, and the location of those openings are shown in FIG. 15 for illustration only and that the invention is not limited to a specific number of interface pads 22D, or to any specific location of those pads on a tie. It is further contemplated that template 76 may be provided with a plurality of central openings 78, but that for any particular tie only certain selected openings are used as described below, to install an interface pad 22D.

In use, template 76 is prepared by fitting the appropriate numbers of interface pads 22D into openings 78. Contact pad 58 of an interface pad 22D may be inserted into a central opening 78, with each of tabs 74 lined up with a notch 80, then locked in place by twisting interface pad 22D, such that each of locking tabs 74 slides over an edge of a notch 80, mechanically connecting interface pad 22D to template 76. The template may then be used to define what will be the upper surface of a tie during the casting process, such that body 49 is embedded within the tie, while contact pad 58 protrudes slightly from what will be, in use, the upper surface of the tie. Once the tie casting process is complete, template 76 may be removed from the tie, such as by pulling template 76 over contact pad 58, away from the cast tie. Locking tabs 74 are preferably flexible enough to allow the template to be removed by pulling or other force, with minimal movement of the interface pad 22D within the tie body, and without pulling the entire interface pad 22D out of the tie body.

In the foregoing specification, the invention has been described with reference to specific embodiments thereof. However, the scope of the claims should not be limited by the preferred embodiments set forth in the examples, but should be given the broadest interpretation consistent with the description as a whole. The specification and drawings are, accordingly, to be regarded in an illustrative rather than a restrictive sense.

What is claimed is:

1. A method of manufacturing a concrete tie having an embedded interface pad, comprising the steps of:
   providing at least one interface pad comprising a tubular body having opposed first and second ends separated by a sidewall and a contact pad on said second end;
   providing a template comprising at least one opening;
   placing said interface pad into said opening such that said second end abuts said template and said contact pad fits within said opening;

placing said template and said interface pad in a concrete tie form;

casting said concrete tie around said template and said interface pad such that said contact pad protrudes from said tie; and removing said template from said tie once said concrete has hardened.

2. The method of claim 1 wherein said interface pad further comprises one or more locking tabs extending from said contact pad and said opening in said template further comprises one or more notches to accommodate said locking tabs.

3. The method of claim 2 wherein said step of removing said template comprises pulling said template over said locking tabs.

4. The method of claim 2 wherein said step of placing said interface pad into said opening comprises:

aligning at least one of said locking tabs with one of said notches;

inserting said contact pad into said opening and said aligned locking tab into said notch; and rotating said interface pad to unalign said locking tabs and said notches.

\* \* \* \* \*